US008100405B2

(12) United States Patent
Kneeland et al.

(10) Patent No.: US 8,100,405 B2
(45) Date of Patent: Jan. 24, 2012

(54) SYSTEM AND METHOD FOR PROVIDING COMPLIANT ROTATING SEALS

(75) Inventors: Andrew Ray Kneeland, Simpsonville, SC (US); Eric David Roush, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 464 days.

(21) Appl. No.: 12/349,021

(22) Filed: Jan. 6, 2009

(65) Prior Publication Data
US 2010/0171268 A1 Jul. 8, 2010

(51) Int. Cl.
*F16J 15/44* (2006.01)

(52) U.S. Cl. ........................................ 277/355

(58) Field of Classification Search ............ 277/355
See application file for complete search history.

(56) References Cited

U.S. PATENT DOCUMENTS

| | | | | |
|---|---|---|---|---|
| 5,218,816 A * | 6/1993 | Plemmons et al. | ............ | 60/806 |
| 5,480,165 A * | 1/1996 | Flower | ............ | 277/355 |
| 6,065,754 A * | 5/2000 | Cromer et al. | ............ | 277/412 |
| 6,173,958 B1 * | 1/2001 | Dinc et al. | ............ | 277/303 |
| 6,533,284 B2 | 3/2003 | Aksit et al. | | |
| 6,536,773 B2 * | 3/2003 | Datta | ............ | 277/355 |
| 6,612,581 B2 * | 9/2003 | Bhate et al. | ............ | 277/355 |
| 6,669,202 B1 * | 12/2003 | Aksit et al. | ............ | 277/355 |
| 6,880,829 B1 | 4/2005 | Datta | | |
| 7,052,015 B2 | 5/2006 | Addis | | |
| 2003/0030220 A1 * | 2/2003 | Datta | ............ | 277/355 |
| 2003/0102629 A1 * | 6/2003 | Bhate et al. | ............ | 277/355 |
| 2003/0102630 A1 * | 6/2003 | Dinc et al. | ............ | 277/355 |
| 2004/0000760 A1 * | 1/2004 | Aksit et al. | ............ | 277/355 |
| 2004/0217549 A1 * | 11/2004 | Justak | ............ | 277/355 |
| 2007/0120327 A1 * | 5/2007 | Justak | ............ | 277/355 |

* cited by examiner

*Primary Examiner* — Gilbert Lee

(74) *Attorney, Agent, or Firm* — Cantor Colburn LLP

(57) ABSTRACT

A system for providing compliant rotating seals including a rotating portion that has one or more teeth extending radially from it, and a stationary portion that has a plurality of bristles extending radially from it. The one or more teeth rotatively engage the plurality of bristles creating a tortuous path between them that resists a leakage of gas or fluid through them.

16 Claims, 2 Drawing Sheets

SYSTEM AND METHOD FOR PROVIDING COMPLIANT ROTATING SEALS

BACKGROUND OF THE INVENTION

The subject matter disclosed herein relates generally to mechanical turbines, and more particularly to a system and method for providing compliant rotating seals.

Mechanical turbines, such as gas or steam turbines, include numerous surfaces that include seals, for example, to reduce or prevent the undesired escape of combusted gases or steam. A particularly challenging form of these seals are those that seal a moving or rotating surface (e.g., with respect to a stationary surface). For example, turbines include rotating surfaces, such as shafts, rotors, etc., that include seals between them and adjacent stationary surfaces, such as stators, shrouds, etc. Labyrinth seals are a popular form of rotating seals for this purpose that include closely mating portions (e.g., straight-threaded extensions or "teeth" that are stationary and/or moving during operation) that mechanically repel the flow of gas or fluid by creating an effective obstacle path that is further enhanced by centrifugal forces during rotation. The sealing performance of labyrinth seals may be enhanced by engaging them with a honeycomb-like material, e.g., attached to an adjacent stationary surface, that provides an abradable mating surface to the moving teeth. Similar applications also apply to so-called knife edge seals.

Radial and/or axial excursions of such seals usually cause a non-recovering groove to develop in the engaged honeycomb material that eventually allows air, gases, etc. to escape past the seal when it is not fully engaged with the groove. Also, with such axial or radial motion, this "rub groove" may position in a different alignment from where the seal positions in a normal operating or "steady state" condition. Seal clearance variation usually also occurs in such seals during radial or axial excursions, which causes inconsistent leakage flow during various operating conditions.

BRIEF DESCRIPTION OF THE INVENTION

According to one aspect of the invention, a system for providing compliant rotating seals includes a rotating portion that has one or more teeth extending radially from it and a stationary portion that has a plurality of bristles extending radially from it. The one or more teeth rotatively engage the plurality of bristles to create a tortuous path between them that resists a leakage of gas or fluid through them.

According to another aspect of the invention, a method for providing compliant rotating seals includes providing a rotating seal that includes a rotating portion that has one or more teeth extending radially from it and a stationary portion that has a plurality of bristles extending radially from it. The one or more teeth rotatively engage the plurality of bristles to create a tortuous path between them that resists a leakage of gas or fluid through them.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Exemplary embodiments of the invention provide a system and method for providing compliant rotating seals. In accordance with such exemplary embodiments, a more compliant rotating seal land is provided that can respond to both radial and axial excursions of rotating seals (such as labyrinth or knife edge seals) more robustly thereby reducing overall seal leakage. A more tortuous path is created along the seal, therefore less gas or fluid leaks through it. The resulting compliant bristle abradable, significantly reduces seal clearance variation, therefore leakage flow is more consistent over a greater range of operating conditions (e.g., seal excursions).

Figure 1:
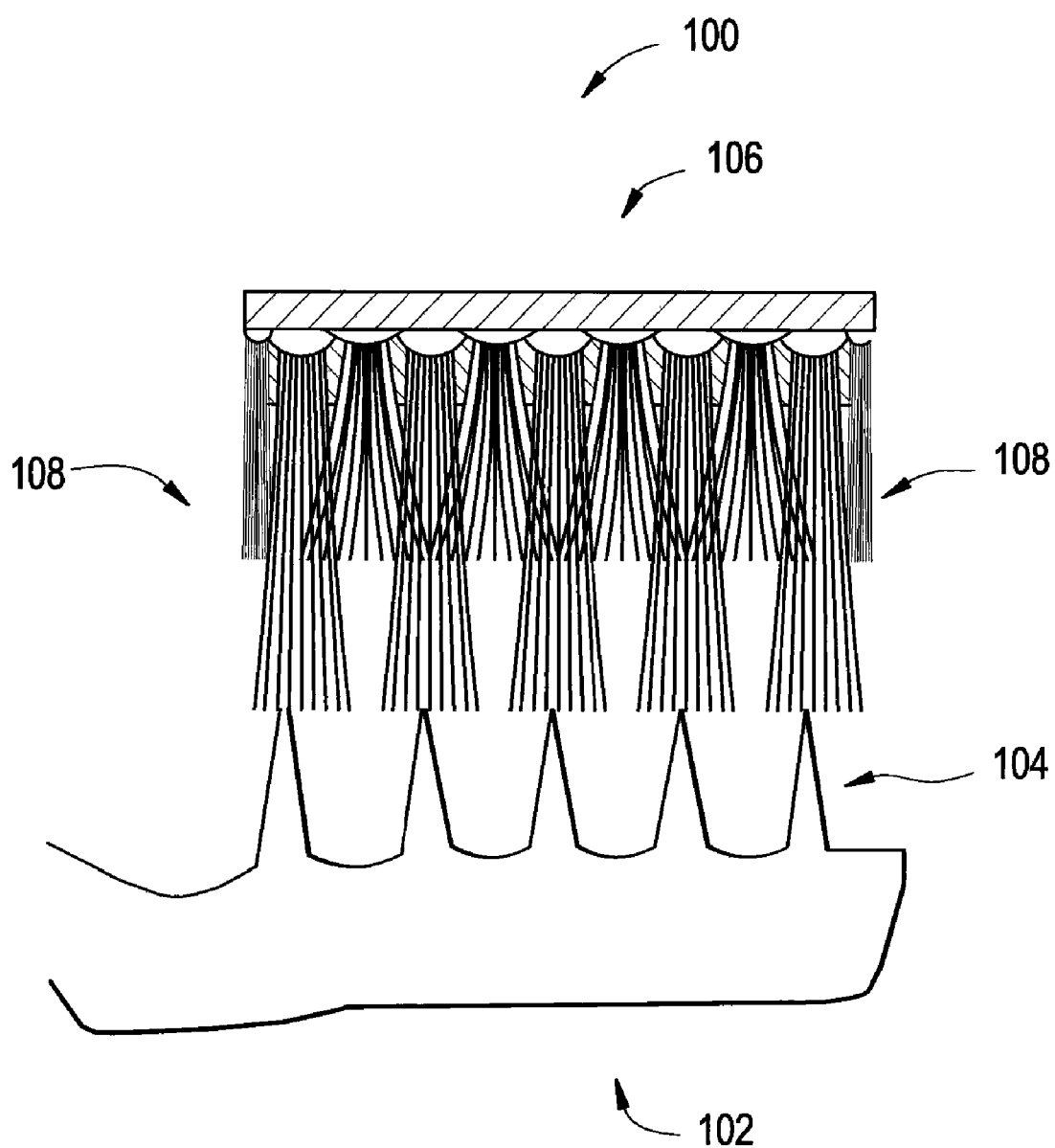
FIG. 1 is a diagram illustrating an exemplary cross sectional view of a compliant bristle abradable rotating seal in accordance with exemplary embodiments of the invention.

FIG. 1 is a diagram illustrating an exemplary cross sectional view of a compliant bristle abradable rotating seal 100 in accordance with exemplary embodiments of the invention. Seal 100 includes a rotating portion 102 that has one or more teeth 104 (e.g., a single tooth or a plurality of teeth) extending radially from it. For example, rotating portion 102 may include a labyrinth seal or knife edge seal that has a single tooth or a plurality of teeth. Seal 100 also includes a stationary portion (or seal land) 106 that has a plurality of bristles 108 extending radially from it. The one or more teeth 104 rotatively engage the plurality of bristles 108 to create a tortuous path between them that resists the leakage of gas or fluid through it. The rotating portion 102 and the stationary portion 106 may be integrated to components of a gas turbine or a steam turbine, such as shafts, rotors, stators, shrouds, etc.

The plurality of bristles 108 may have varying characteristics, such as according to the following exemplary embodiments. The plurality of bristles 108 may be packed together to form a plurality of bristle packs. The plurality of bristles 108 may be arranged in layers forming multiple sealing planes with respect to the one or more teeth 104. The plurality of bristles 108 may include bristles of different lengths (e.g., as depicted in FIG. 1). The plurality of bristles 108 may include an arrangement of brush seals.

The plurality of bristles 108 may be constructed to substantially return to an original position when not engaged by the one or more teeth 104. That is, the one or more teeth 104 may spread, bend, etc. the bristles 108 during rotation through them, but the bristles 104 will return to a non-spread, non-bent, etc. position when not engaged by the one or more teeth 104, thereby providing a more compliant seal land. The one or more teeth 104 and the plurality of bristles 108 may each be constructed of a metallic material or a nonmetallic material (or a composite thereof).

Figure 2:
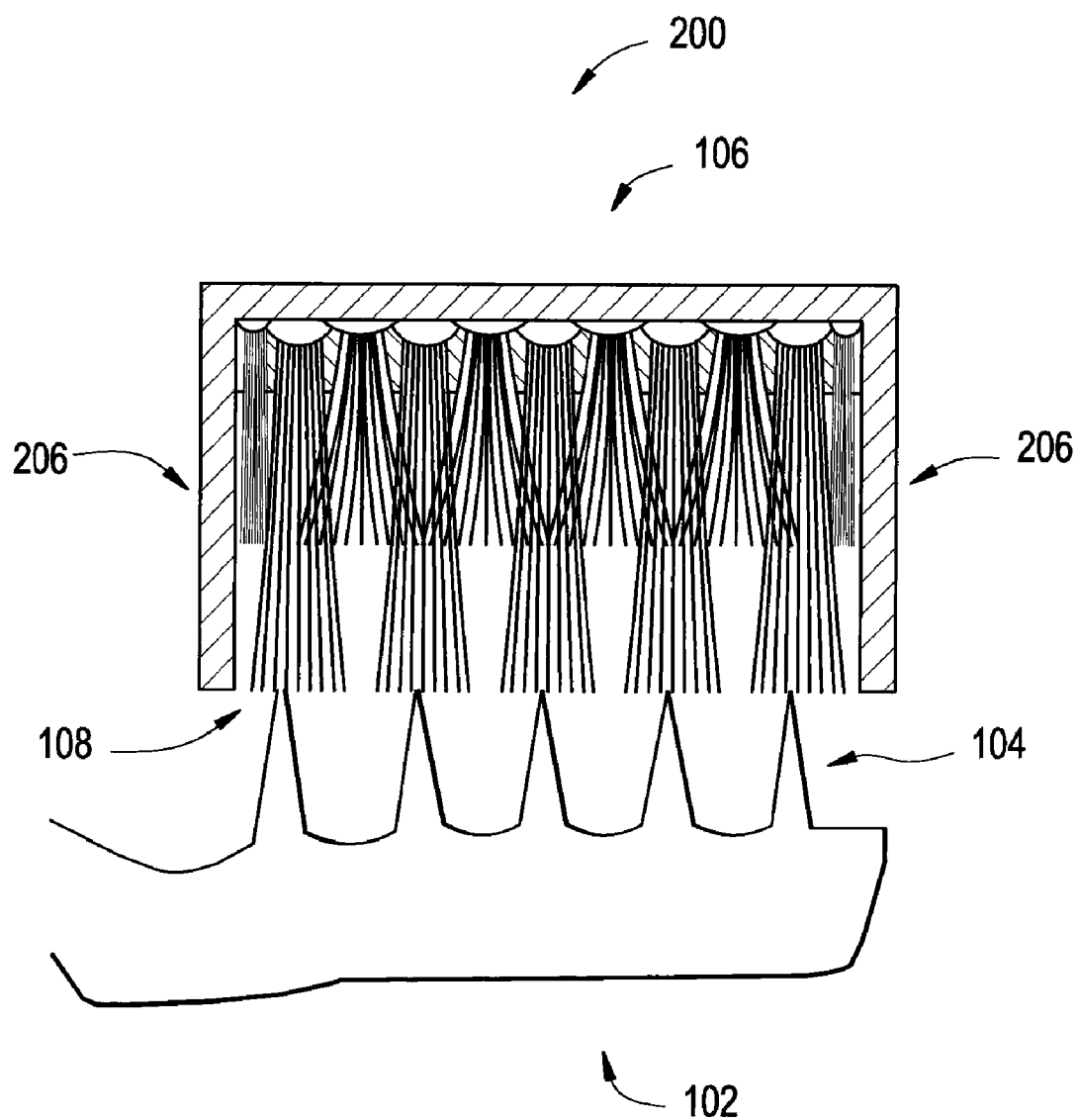
FIG. 2 is a diagram illustrating an alternate exemplary cross sectional view of a compliant bristle abradable rotating seal in accordance with exemplary embodiments of the invention.

In some embodiments, stationary portion 106 further includes one or more (e.g., a pair) of end plates 206 that extend radially from the stationary portion 106 adjacent to the plurality of bristles 108. In that regard, FIG. 2 is a diagram illustrating an alternate exemplary cross sectional view of a compliant bristle abradable rotating seal 200 in accordance with exemplary embodiments of the invention. In addition to the above description of same numbered elements for FIG. 1., the plurality of bristles 108 extend between the pair of plates 206 in seal 200. The plates 206, e.g., resist axial motion of the plurality of bristles 108 when engaged by the one or more teeth 104.

Exemplary embodiments of the invention also include a method or process for providing compliant rotating seals (not depicted), which includes providing a compliant bristle abradable rotating seal 100, 200 as described above for FIGS. 1 and 2 (including exemplary variations). Such exemplary method or process may include execution of a computer program product in some embodiments.

Thus, the technical effect of exemplary embodiments of the invention is a system and method for providing compliant rotating seals. According to exemplary embodiments, a rotating seal includes a rotating portion that has one or more teeth extending radially from it. The rotating seal also includes a stationary portion that has a plurality of bristles extending radially from it. The one or more teeth rotatively engage the plurality of bristles to create a tortuous path between them that resists the leakage of gas or fluid through it.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for providing compliant rotating seals, comprising:
    a rotating portion having one or more teeth extending radially therefrom; and
    a stationary portion having a first and second plurality of bristles extending radially therefrom, the first plurality of bristles having a first length that define a first sealing plane and the second plurality of bristles being interposed between the first plurality of bristles and having a second length that defines a second sealing plane that is distinct from the first sealing plane, the one or more teeth rotatively engaging the plurality of bristles creating a tortuous path therebetween that resists a leakage of gas or fluid therethrough.

2. The system of claim 1, wherein the plurality of bristles are packed together forming a plurality of bristle packs.

3. The system of claim 1, wherein the plurality of bristles comprise an arrangement of brush seals.

4. The system of claim 1, wherein the rotating portion comprises a labyrinth seal or a knife edge seal.

5. The system of claim 1, wherein the plurality of bristles are constructed to substantially return to an original position when not engaged by the one or more teeth.

6. The system of claim 1, wherein the one or more teeth and the plurality of bristles are each constructed of a metallic material or a nonmetallic material.

7. The system of claim 1, further comprising a pair of end plates that extend radially from the stationary portion adjacent to the plurality of bristles, wherein the plurality of bristles extend between the pair of plates, the plates resisting axial motion of the plurality of bristles when engaged by the one or more teeth.

8. The system of claim 1, wherein the rotating portion and the stationary portion are integrated to components of a gas turbine or a steam turbine.

9. A method for providing compliant rotating seals, comprising providing a rotating seal, the rotating seal comprising:
    a rotating portion having one or more teeth extending radially therefrom; and
    a stationary portion having a first and second plurality of bristles extending radially therefrom, the first plurality of bristles having a first length that define a first sealing plane and the second plurality of bristles being interposed between the first plurality of bristles and having a second length that defines a second sealing lane that is distinct from the first sealing plane, the one or more teeth rotatively engaging the plurality of bristles creating a tortuous path therebetween that resists a leakage of gas or fluid therethrough.

10. The method of claim 9, wherein the plurality of bristles are packed together forming a plurality of bristle packs.

11. The method of claim 9, wherein the plurality of bristles comprise an arrangement of brush seals.

12. The method of claim 9, wherein the rotating portion comprises a labyrinth seal or a knife edge seal.

13. The method of claim 9, wherein the plurality of bristles are constructed to substantially return to an original position when not engaged by the one or more teeth.

14. The method of claim 9, wherein the one or more teeth and the plurality of bristles are each constructed of a metallic material or a nonmetallic material.

15. The method of claim 9, wherein the rotating seal further comprises a pair of end plates that extend radially from the stationary portion adjacent to the plurality of bristles, wherein the plurality of bristles extend between the pair of plates, the plates resisting axial motion of the plurality of bristles when engaged by the one or more teeth.

16. The method of claim 9, wherein the rotating portion and the stationary portion are integrated to components of a gas turbine or a steam turbine.

* * * * *